(12) United States Patent
Geernaert et al.

(10) Patent No.: US 8,958,676 B2
(45) Date of Patent: Feb. 17, 2015

(54) BIREFRINGENT MICRO-STRUCTURED OPTICAL FIBER FOR SENSOR APPLICATION

(75) Inventors: Thomas Geernaert, Buggenhout (BE); Francis Berghmans, Westerlo (BE); Tomasz Nasilowski, Etterbeek (BE); Hugo Thienpont, Gooik-Oetingen (BE); Mariusz Makara, Lublin (PL); Pawel Mergo, Lublin (PL); Krzysztof Grzegorz Poturaj, Lublin (PL); Waclaw Urbanczyk, Wroclaw (PL); Tadeusz Martynkien, Kalisz (PL); Jacek Marek Olszewski, Wroclaw (PL); Jan Jozef Wojcik, Lublin (PL)

(73) Assignees: Uniwersytet Marii Curie Sklodowskiej, Lublin (PL); Wroclaw University of Technology, Wroclaw (PL); Vrije Universiteit Brussel, Brussels (BE)

(*) Notice: Subject to any disclaimer, the term of this patent is extended or adjusted under 35 U.S.C. 154(b) by 2 days.

(21) Appl. No.: 13/510,689

(22) PCT Filed: Nov. 19, 2010

(86) PCT No.: PCT/EP2010/067862
§ 371 (c)(1),
(2), (4) Date: May 18, 2012

(87) PCT Pub. No.: WO2011/061309
PCT Pub. Date: May 26, 2011

(65) Prior Publication Data
US 2012/0224811 A1    Sep. 6, 2012
US 2013/0163927 A9    Jun. 27, 2013

(30) Foreign Application Priority Data

Nov. 19, 2009 (WO) ............... PCT/EP2009/065458

(51) Int. Cl.
*G02B 6/00* (2006.01)
*G02B 6/02* (2006.01)
(Continued)

(52) U.S. Cl.
CPC ............ *G02B 6/02338* (2013.01); *G01D 5/353* (2013.01); *G02B 6/02109* (2013.01);
(Continued)

(58) Field of Classification Search
USPC ............................................. 385/125; 65/385
See application file for complete search history.

(56) References Cited

U.S. PATENT DOCUMENTS 5,056,888 A * 10/1991 Messerly et al. ............. 385/123
5,309,540 A *  5/1994 Turpin et al. ................. 385/123
(Continued)

FOREIGN PATENT DOCUMENTS

JP        2002277666 A        9/2002

OTHER PUBLICATIONS

Geernaert et al., "Fiber Bragg Gratings in Germanium-Doped Highly Birefringent Microstructured Optical Fibers," IEEE Photon. Technol. Lett. 20, 554 (2008).*

(Continued)

*Primary Examiner* — Peter Radkowski
(74) *Attorney, Agent, or Firm* — Bacon & Thomas, PLLC (57) ABSTRACT

Fiber structure including a core and a cladding, a central microstructure having a first plurality of longitudinal holes and which is adapted for guiding optical radiation and for birefringence in the core. Also included is a side microstructure having a second plurality of longitudinal holes is provided, wherein the side microstructure partly surrounds the central microstructure and provides a predetermined mechanical anisotropy, a pressure responsive unit for converting an isotropic pressure force to birefringence changes on the core, a lateral force responsive unit for converting a directional pressure force to birefringence changes on the core, a temperature responsive unit for converting temperature to birefringence changes on the core, and a birefringence responsive unit for converting birefringence in the core to wavelength information.

30 Claims, 7 Drawing Sheets

(51) Int. Cl.
*G01D 5/353* (2006.01)
*G02B 6/10* (2006.01)
(52) U.S. Cl.
CPC .......... *G02B 6/02357* (2013.01); *G02B 6/105* (2013.01); *G02B 6/02371* (2013.01)
USPC .......................................... 385/125; 65/385

(56) References Cited

U.S. PATENT DOCUMENTS

| | | | |
|---|---|---|---|
| 5,802,236 A * | 9/1998 | DiGiovanni et al. | 385/127 |
| 5,828,059 A * | 10/1998 | Udd | 250/227.18 |
| 5,841,131 A * | 11/1998 | Schroeder et al. | 250/227.17 |
| 6,097,870 A * | 8/2000 | Ranka et al. | 385/127 |
| 6,243,522 B1 * | 6/2001 | Allan et al. | 385/123 |
| 6,400,869 B2 * | 6/2002 | Pan et al. | 385/37 |
| 6,404,966 B1 * | 6/2002 | Kawanishi et al. | 385/125 |
| 6,515,305 B2 * | 2/2003 | Gopinath | 257/79 |
| 6,542,681 B2 * | 4/2003 | Broeng et al. | 385/123 |
| 6,563,995 B2 * | 5/2003 | Kane et al. | 385/127 |
| 6,600,149 B2 * | 7/2003 | Schulz et al. | 250/227.14 |
| 6,707,957 B1 * | 3/2004 | Reynolds et al. | 385/11 |
| 6,724,528 B2 * | 4/2004 | Koplow et al. | 359/341.1 |
| 6,888,992 B2 * | 5/2005 | Russell et al. | 385/125 |
| 6,954,574 B1 * | 10/2005 | Russell et al. | 385/125 |
| 7,120,339 B2 * | 10/2006 | Varnham et al. | 385/123 |
| 7,280,728 B2 * | 10/2007 | Berkey et al. | 385/123 |
| 7,289,709 B2 * | 10/2007 | Folkenberg et al. | 385/126 |
| 7,593,611 B2 * | 9/2009 | Guan et al. | 385/125 |
| 7,724,422 B2 * | 5/2010 | Abramczyk et al. | 359/341.1 |
| 7,773,834 B2 * | 8/2010 | Ouderkirk et al. | 385/11 |
| 7,782,910 B2 * | 8/2010 | Fermann et al. | 372/6 |
| 7,787,729 B2 * | 8/2010 | Dong et al. | 385/123 |
| 7,841,213 B2 * | 11/2010 | Kinoshita et al. | 65/393 |
| 7,940,389 B2 * | 5/2011 | Rogers et al. | 356/365 |
| 8,213,070 B2 * | 7/2012 | Koplow | 359/238 |
| 8,295,667 B2 * | 10/2012 | Watte et al. | 385/125 |
| 2001/0026667 A1 * | 10/2001 | Kawanishi et al. | 385/125 |
| 2002/0061176 A1 * | 5/2002 | Libori et al. | 385/125 |
| 2002/0071646 A1 * | 6/2002 | Eggleton et al. | 385/125 |
| 2002/0079497 A1 * | 6/2002 | Gopinath | 257/79 |
| 2002/0131741 A1 * | 9/2002 | Bayart et al. | 385/123 |
| 2002/0159139 A1 * | 10/2002 | Koplow et al. | 359/342 |
| 2002/0172486 A1 * | 11/2002 | Fermann | 385/128 |
| 2003/0086668 A1 * | 5/2003 | Kliner et al. | 385/123 |
| 2004/0093950 A1 * | 5/2004 | Bohnert | 73/705 |
| 2004/0105641 A1 * | 6/2004 | Russell et al. | 385/125 |
| 2006/0013545 A1 * | 1/2006 | Varnham et al. | 385/123 |
| 2006/0088262 A1 * | 4/2006 | Berkey et al. | 385/125 |
| 2006/0291789 A1 * | 12/2006 | Folkenberg et al. | 385/123 |
| 2008/0056656 A1 * | 3/2008 | Dong et al. | 385/125 |
| 2008/0068606 A1 * | 3/2008 | Rogers et al. | 356/365 |
| 2008/0095199 A1 * | 4/2008 | Abramczyk | 372/6 |
| 2010/0135616 A1 * | 6/2010 | Watte et al. | 385/50 |
| 2011/0157671 A1 * | 6/2011 | Koplow | 359/238 |

OTHER PUBLICATIONS

Szpulak et al. "Effects of Hydrostatic Pressure on Phase and Group Modal Birefringence in Microstructured Holey Fibers," Appl. Opt. 43, 4739-4744 (2004).*

Kotynski, R.; Panajotov, K.; Antkowiak, M.; Nasilowski, T.; Lesiak, P.; Wojcik, J.; Thienpont, H., "Interplay of form and material birefringence in photonic crystal fibers: application for sensing," Transparent Optical Networks, 2004. Proceedings of 2004 6th International Conference on , vol. 2, No., pp. 95,98 vol. 2, Jul. 4-8, 2004.*

Geernaert, Thomas, et al., "Transversal Load Sensing with Fiber Bragg Gratings in Microstructured Optical Fibers", IEEE Photonics Technology Letters, vol. 21, No. 1, Jan. 1, 2009, pp. 6-8.

Geernaert, Thomas, et al., "Fiber Bragg Gratings in Germanium-Doped Highly Birefringent Microstructured Optical Fibers", IEEE Photonics Technology Letters, vol. 20., No. 8, Apr. 15, 2008, pp. 554-556.

Kotynski, Rafal, et al., "Interplay of Form and Material Birefringence in Photonic Crystal Fibers: Application for Sensing", Transparent Optical Networks, 2004, pp. 95-98.

Luyckx, Eli Voet, et al., "Response of FBGs in Microstructured and Bow Tie Fibers Embedded in Laminated Composite", IEEE Photonics Technology Letters, vol. 21, No. 18, Sep. 15, 2009, pp. 1290-1292.

Martynkien, T., et al., "Measurements of polarimetric sensitivity to temperature in birefringent holey fibres", Measurement Science and Technology, vol. 18, 2007, pp. 3055-3060.

Martynkien, Tadeusz, et al. "Measurements of sensitivity to hydrostatic pressure and temperature in highly birefringent photonic crystal fibers", Optical and Quantum Electronics, vol. 39, No. 4-6, Jun. 22, 2007, pp. 481-489.

Olszewski, Jacek, et al., "Confinement Losses in the Birefringent Holey Fibers", ICTON 2004, pp. 354-357.

Szpulak, Marcin, et al., "Highly Birefringent Photonic Crystal Fibre with Enhanced Sensitivity to Hydrostatic Pressure", ICTON 2006, pp. 174-177.

Wojcik, Jan, et al., "Technology of high birefringent photonic crystal fibers for sensing application", Proceedings of the SPIE, vol. 6189, Apr. 22, 2006, pp. 618902-1-318902-9.

Yan, C., "Development of flexible pressure sensing polymer foils based on embedded fibre Bragg grating sensors", Science Direct, Procedia Engineering 5, Sep. 5-8, 2010, pp. 272-275.

International Search Report for PCT/EP2009/065458, Aug. 12, 2010.
International Search Report and Written Opinion for PCT/EP2010/067862, Feb. 21, 2011.
Written Opinion for PCT/EP2010/067862, Oct. 20, 2011.
IPRP for PCT/EP2010/067862, Feb. 15, 2012.

* cited by examiner

BIREFRINGENT MICRO-STRUCTURED OPTICAL FIBER FOR SENSOR APPLICATION

FIELD OF THE INVENTION

The invention relates to the field of fiber structures, preferably adapted for use with fiber Bragg gratings in sensors as well as to optical systems using such fibers and method of operating and making such devices.

BACKGROUND OF THE INVENTION

A photonic crystal fiber, PCF for short, is a class of optical fiber based on the properties of photonic crystals. Due to the ability to confine light in hollow cores or with confinement characteristics not possible in conventional optical fiber, PCF is finding applications in fiber optic communications, fiber lasers, non-linear devices, high power transmission, highly sensitive gas sensors and in other areas. In the following, PCFs using air holes in their cross sections are also called "holey fiber".

However, in the fiber structures presently known the ratio of mechanical to thermal sensitivity is currently moderate.

Most existing results on the sensitivity of birefringent microstructured optical fibers (MOF) are results on the polarimetric sensitivity of the MOF to an external perturbation, e.g. pressure or temperature changes. A polarimetric measurement is based on the phase difference of light that has propagated along the two orthogonally polarized modes. The change of this phase difference with the external perturbation is linked with the change in birefringence of the fiber by that perturbation. A polarimetric measurement setup consists of a light source with a controlled polarization and a polarization sensitive detector.

Previous work on the use of fiber Bragg gratings in highly birefringent microstructured optical fibers shows that these sensors can be successfully embedded inside carbon-fiber epoxy laminate composite materials, that they can be sensitive to transverse strain and that they show a temperature sensitivity. This is different from that of FBGs in conventional birefringent fibers. Microstructured optical fibers (MOF) have not featured a high transverse strain sensitivity, i.e. higher than in conventional birefringent fibers. Also the temperature sensitivity of an FBG in such an MOF cannot be tailored. The known fibers show a very low temperature sensitivity.

SUMMARY OF THE INVENTION

It is the object of the invention to provide alternative fiber structures, preferably adapted for use with fiber Bragg grating based sensors as well as optical systems using such fibers and method of operating and making such devices.

The above object is achieved by the subject matter of the independent claims. Preferred embodiments are defined in the sub claims.

In one aspect the present invention provides an optical fiber with a central holey region or structure which may include a central microstructure or a combination of central microstructure and part of a side macrostructure and a further holey structure at least partly surrounding the central holey structure and being adapted for providing a predetermined mechanical or geometrical anisotropy that is pressure responsive, namely converting an isotropic pressure force to birefringence changes on the core, or lateral force responsive, namely adapted for converting a directional pressure force to birefringence changes on the core, and a birefringence responsive unit adapted for converting birefringence in the core to wavelength information.

The further holey structure may be a side microstructure or a side macro structure.

The optical fiber according to embodiments of the present invention may be used for Bragg grating-based sensing with high pressure sensitivity and low or zero temperature sensitivity.

Accordingly the present invention provides a fiber structure comprising:
a core and a cladding surrounding the core;
a central structure comprising a first plurality of longitudinal holes, wherein the central structure is adapted for guiding optical radiation and providing an initial level of birefringence in the core via geometrical birefringence;
a side holey structure comprising a second plurality of longitudinal holes, wherein the side holey structure is at least partly surrounding the central microstructure and is adapted for providing a predetermined anisotropic response to mechanical perturbations; and
a birefringence responsive unit adapted for converting birefringence in the core to wavelength information.

An advantage of embodiments of the present invention is the possibility for increasing the ratio of mechanical to thermal sensitivity of a fiber structure in conjunction with mechanical and thermal sensitivities that can be tailored.

Another advantage of some embodiments of the present invention is the possibility for changing the mechanical sensitivity of a fiber structure to have either a positive or negative coefficient.

According to another aspect of the invention, a fiber structure is provided comprising a core and a cladding surrounding the core, a central holey structure such as a central microstructure, the central holey structure comprising a first plurality of longitudinal holes, wherein the central holey structure such as the central microstructure is adapted for guiding optical radiation and for providing birefringence in the core and for converting temperature to birefringence changes on the core, a side microstructure comprising a second plurality of longitudinal holes, wherein the side microstructure is at least partly surrounding the central holey structure such as the central microstructure and is adapted for providing a predetermined mechanical or geometrical anisotropy that is pressure responsive, namely adapted for converting an isotropic pressure force to birefringence changes on the core or lateral force responsive, namely adapted for converting a directional pressure force to birefringence changes on the core, and a birefringence responsive unit adapted for converting birefringence in the core to wavelength information.

The birefringence responsive unit according to embodiments of the present invention can be a localised 'point' sensor, e.g. a fiber Bragg grating (FBG). This is in contrast to polarimetric sensors which 'integrate' all perturbations along the fiber, without any knowledge of the location of the perturbation along the fiber. Although the sensitivity of the Bragg peak separation coming from an FBG in a birefringent MOF is related to the phase modal birefringence, the sensitivity of the birefringence cannot be directly interpreted as the sensitivity of the Bragg peak separation, especially for the temperature sensitivity.

Geometrical anisotropy relates to the asymmetric arrangement of the airholes in the central microstructure that foresees the geometrical (or waveguide) birefringence. This does not refer to the side microstructure or a side macrostructure that aims at providing a pressure sensitivity via an asymmetric response to mechanical strain.

Preferably, the holes around the fiber core are the source for a geometrical anisotropy and thus geometrical birefringence. Air holes do preferably not contribute to stress anisotropy. Preferably, there is some "frozen anisotropy" in the fiber core appearing due to the glass flow during the fiber drawing process. It is noted that "frozen anisotropy" is rather random and is difficult to control. Preferably, stress anisotropy appears if, instead of air, inclusions are made of some other glasses, such as doped silica glass.

According to a second aspect of the invention, this object is achieved by a fiber structure comprising a core and a cladding surrounding the core, a central holey structure such as a central microstructure comprising a first plurality of longitudinal holes, wherein the central holey structure, e.g. the central microstructure is adapted for guiding optical radiation and for providing birefringence in the core and for converting temperature to birefringence changes on the core, a macrostructure at least partly surrounding the central microstructure, wherein the macrostructure is adapted for providing a predetermined mechanical or geometrical anisotropy that is pressure responsive, namely adapted for converting an isotropic pressure force to birefringence changes on the core or lateral force responsive, namely adapted for converting a directional pressure force to birefringence changes on the core, and a birefringence responsive unit adapted for converting birefringence in the core to wavelength information.

The central holey structure such as the central microstructure provides optical waveguide properties. For example, if the side microstructure or side macrostructure would be removed, the optical waveguide properties of the fiber would not change significantly, namely only the sensitivities would change. Thus the term "guiding optical radiation", refers for example, to the central holey structure transmitting about 99% or more, e.g. 99.99% of the light transferred along the optical fiber. In particular a central region bordered by at least some of the holes of the central microstructure defines a transmission pathway for about 99% or more, e.g. 99.99% of the light transferred along the optical fiber.

"Microstructure" refers to a collection of small airholes. Small means that the diameter of the airholes is smaller then the distance between the airholes. The term "macrostructure" refers to a large airhole of which the features sizes are significantly larger than those in the microstructure. For example, the diameter of an airhole of a macrostructure is larger than the distance between the airholes in the microstructure.

The feature sizes of the macrostructure are larger than that of the microstructure, e.g. the diameter (or feature size) of an airhole in the macrostructure can be larger than twice the airhole distance in the microstructure.

With reference to the first and/or second aspects, the total birefringence of the MOF is determined by both its geometrical (or waveguide) birefringence and by its material birefringence (often stress-induced). In MOFs according to embodiments of the present invention both types of birefringence are present. The central microstructure is responsible for the initial level of birefringence in the core mainly via geometrical birefringence and for a very small part by material birefringence that is the result of temperature-induced stress via the difference in thermal expansion coefficient between the doped region in the core and the undoped cladding. On the other hand the side microstructure (first aspect) or alternatively the macrostructure (second aspect) introduces material birefringence via an asymmetric stress-distribution in the cross-section of the MOF and as a result affects the pressure sensitivity of the Bragg peak separation for an FBG in such an MOF.

Geometrical anisotropy does not refer to the side microstructure or of the macrostructure that aims at providing a pressure sensitivity via an asymmetric response to mechanical strain.

Use of an FBG in a fiber according to the first or second aspect as sensor requires a connection of the fiber with an interrogation device that contains a light source and a detector to measure the spectral response of the FBG. The task of the birefringence responsive unit is to encode the birefringence and thus also the change of the birefringence into wavelength information. Thus in an additional embodiments of the present invention a light source is provided as well as external measurement equipment that is not included in the MOF.

According to a preferred embodiment of the invention, the central microstructure comprises a plurality of air holes, more preferably three rows of air holes arranged next to one another, wherein the diameter of the middle row is smaller than the diameter of the two outer rows. If the holes are not completely circular the average of the largest and smallest diameter can be taken as the relevant diameter.

However, according to other preferred embodiments of the invention, the air holes and/or other inclusions are not perfectly arranged circular. The fiber is birefringent initially and pressure, force, temperature etc. may change this birefringence. Preferably fibers according to embodiments of the present invention have a high level of initial birefringence, e.g. of the order of $10^{-3}$. The present invention does not exclude fibers that have only a low initial birefringence or even a zero initial birefringence, although this will affect the pressure range in which these fibers can be used. Reference is made to the level of initial birefringence that is provided by the central microstructure rather than material birefringence that could be induced by an external perturbation such as external pressure. It is preferred if the fiber according to the present invention is birefringent to the order of $10^{-3}$, before any pressure acts on the fiber, so that the wavelength separation between the two Bragg peak reflections can be determined for low pressure values as well. The measurement signal of the birefringence responsive unit, e.g. a fiber Bragg grating, would otherwise only become useable when the material birefringence induced in the fiber by the external pressure via the side microstructure becomes high enough so that the Bragg peak wavelengths for an FBG in such a fiber do not overlap anymore and can be accurately determined.

Referring to the first aspect of the invention, the cladding preferably comprises an inner cladding and an outer cladding, each of the inner cladding and the outer cladding provides circular features. The inner and outer cladding refer to the central microstructure and the side microstructure. The airholes in the microstructures are not necessarily circular. Referring to the second aspect of the invention, the cladding preferably comprises an inner cladding and an outer cladding, the inner cladding providing circular features and the outer cladding providing features different from circular features. If the holes are not completely circular the average of the largest and smallest diameter can be taken as the relevant diameter. The shape of the macrostructure is not necessarily circular.

According to another preferred embodiment of the invention, the material of the core is different from the material of the cladding. The birefringence responsive unit preferably comprises at least one grating arranged at least partly in the core. Preferably, the first plurality of longitudinal holes is arranged such that their longitudinal axes are parallel relative to the longitudinal axis of the core. Preferably, at least a portion out of the first and/or second plurality of longitudinal holes comprises same sizes and/or same shapes. Preferably, the first and/or the second plurality of longitudinal holes comprise(s) a circular cross section, an elliptical cross section, a ring-like cross section or a hexagonal cross section and is/are adapted for obtaining a predetermined birefringence, a predetermined pressure sensitivity, a predetermined force sensitivity, a predetermined temperature sensitivity, a predetermined ratio of pressure sensitivity and temperature sensitivity, and/or a predetermined ratio of force sensitivity and temperature sensitivity.

The central microstructure is preferably adapted for obtaining a predetermined birefringence and predetermined temperature sensitivity and the side microstructure is adapted for providing a predetermined pressure sensitivity, lateral force sensitivity. Accordingly, the central microstructure and the side microstructure are adapted for providing a predetermined ratio of the pressure to temperature sensitivity or lateral force to temperature sensitivity.

According to yet another preferred embodiment of the invention, the predetermined temperature sensitivity comprises a value ≤1 pm/1 K, more preferably a value ≤1 pm/10 K, most preferably a value ≤1 pm/100 K. Preferably, the predetermined pressure sensitivity comprises a value ≥1 pm/1 MPa, more preferably a value ≥1 pm/0.5 MPa, most preferably a value ≥1 pm/0.1 MPa. According to yet other preferred embodiments of the invention, the predetermined pressure sensitivity comprises a value of ≥1 pm/50 kPa. Preferably, the predetermined force sensitivity comprises a value ≥1 pm/0.01 N/mm, more preferably a value ≥1 pm/0.005 N/mm, most preferably a value ≥1 pm/0.001 N/mm.

Optical fibers according to embodiments of the present invention have a central microstructure that determines the direction of the slow and fast axis of the optical fiber with respect to the side holey structures and as a result determines the sensitivity of the Bragg peak wavelengths that corresponds to the slow and fast axes for an FBG in that fiber and also determines a positive or negative sign of the differential Bragg peak sensitivity.

Referring to the second aspect of the invention, the macrostructure preferably comprises at least two side-holes arranged opposite to each other and is adapted for determining the phase modal birefringence of the fiber structure. Preferably, the shape of the two side-holes is adapted for reducing confinement losses and is chosen from a shape comprising an elliptical, a rectangular and/or a circular shape. Referring to the first and second aspect of the invention, the shape of the outer cladding preferably comprises a D-shape, an elliptical shape, a circular shape and/or hexagonal shape. Preferably, the material of the fiber structure comprises glass, non-silica glass with holes filled preferably with air. Optionally, a gas, liquid, polymer and/or a solid material can be used as filling. The shape of the outer cladding refers to the shape of the outside edge of the cross-section of the fiber. Examples are a D-shaped cladding, circular cladding and hexagonal cladding.

According to yet another preferred embodiment of the invention, the arrangement of the first and/or second plurality of longitudinal holes is obtained by using an optimization method. The optimization method preferably corresponds to a numerical method known to the skilled person.

According to a third aspect of the invention, this object is achieved by a method of use of a fiber structure according to the first and second aspect of the invention with fiber Bragg gratings in at least one of the following sensor applications: structural health monitoring of composite material structures, such as in aircraft structures; monitoring of pressure and strain in the presence of ionizing radiation, such as in civil nuclear applications, in military applications, in space applications and/or in high energy physics applications. The latter is due to the fact that temperature insensitivity translates in the insensitivity to highly energetic dose of the Bragg peak separation. It is noted that the invention is also applicable for pressure monitoring, such as in oil and gas exploration.

It is an idea of the invention to provide a microstructured optical fiber comprising a specially designed core and a specially designed cladding, each adapted for providing single mode guidance, high birefringence and/or a high pre-defined sensitivity to both temperature and transverse mechanical load at a pre-defined wavelength or for a pre-defined wavelength range. Therefore, a fiber structure is provided with a ratio of mechanical to thermal sensitivity which is up to several orders of magnitude larger than known in single mode fibers with similar size mode areas. In addition, the mechanical and thermal sensitivities can be tailored. It is also possible to manufacture and design such a fiber structure. Preferably, such fibers are made photosensitive, i.e. they allow the writing of multiple grating structures in the core along their length.

In the following, such a type of optical fiber structure is also referred to as microstructured optical fiber, which is characterized by the topology and geometry of the plurality of longitudinal holes arranged in the cladding and/or in the core and that run along the length of the fibers. It is noted that when a microstructured fiber is highly birefringent, it is also referred to as highly birefringent microstructured fiber, HB MSF for short, comprising fiber Bragg gratings, FBGs for short, as a differential sensor with Bragg peak separation and dedicated fiber cross section that gives, for instance, a predetermined temperature sensitivity which includes the compensation of the temperature sensitivity of peak separation by introducing the trade-off between the phase birefringence dispersion, an adequate germanium dioxide, $GeO_2$ for short, doping level in the core and an adequate diameter of the core. By an adequate hole design a predefined pressure and transversal line load sensitivity is obtained. This is preferably done by placing two very large holes or two groups of large holes into the cross section of the microstructured fiber as close as possible to the fiber core and thus such sensitivities can be obtained.

It is worth noting that the invention makes it possible to separately measure the local pressure and the temperature dependency of the fiber structure in conjunction with inserting or writing a fiber Bragg grating into the core of the fiber structure.

BRIEF DESCRIPTION OF THE DRAWINGS

These and other aspects of the invention will be apparent from and elucidated with reference to the embodiments described hereinafter.

In the drawings.

DETAILED DESCRIPTION OF THE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The present invention relates in one aspect to microstructured fiber, of which two types of the inventive microstructured fiber are discussed in the following as being representative of a class of such fibers. According to a embodiments of the present invention, a fiber structure with a central holey and a side holey structure are described, wherein the side holey structure is at least partly surrounding the central holey structure. Two embodiments are described as representative examples of the more general concept. According to a preferred embodiment of the invention, a fiber structure with a central and a side microstructure is analyzed, wherein the side microstructure is at least partly surrounding the central microstructure. According to another preferred embodiment of the invention, a fiber structure with a central microstructure and large side-holes is analyzed.

The first type is a combination of a central microstructure adapted for guiding the light and two large microstructured regions or a surrounding microstructured region resulting in high stress anisotropy in the fiber core, especially when the fiber is put under hydrostatic pressure. Anisotropy should be understood here as anisotropic stiffness or anisotropic response to a mechanical strain.

Fabrication of this type of fiber is achievable with the current fabrication technology of silica glass fibers. The second type is a combination of a central microstructure adapted for guiding the light and comprising at least two large side-holes causing high stress anisotropy in the fiber core when the fiber is put under pressure. Current fabrication technology allows manufacturing such a fiber structure made from polymer material or from soft glass. However, also for silica glass this can be feasible.

It is worth noting that in general, the dimensions of all fiber structures can be scaled up or down according to the desired operating wavelength, taking into account the technological limits. In the following, the range of geometrical parameters is chosen for wavelengths around 1550 nm.

Figure 1:
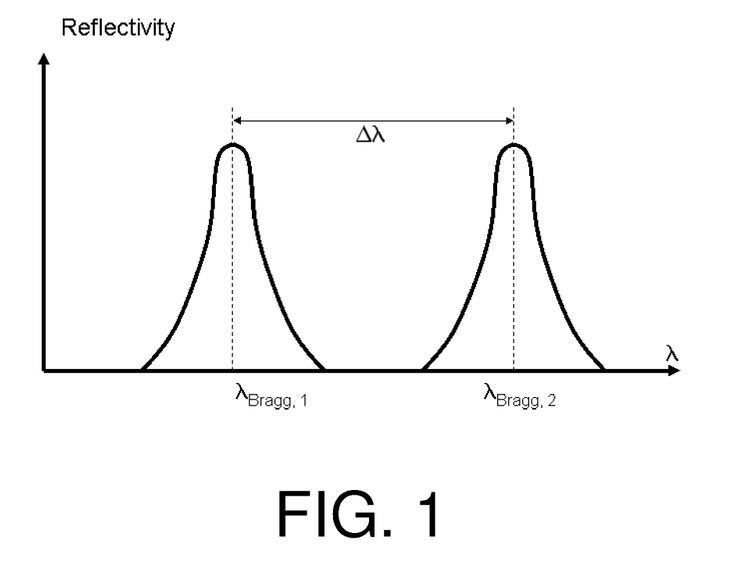
FIG. 1 shows two reflection peaks of a fiber Bragg grating written into a fiber structure according to a first preferred embodiment of the invention.

According to a first preferred embodiment of the invention, such a fiber structure provides a basis for a sensor adapted for encoding pressure, preferably isotropic pressure, or a transverse load, i.e. a directional load perpendicular to the fiber axis, into the distance in wavelength $\Delta\lambda$ between the two reflection peaks of a Bragg grating written in such a fiber structure and as shown in FIG. 1. FIG. 1 illustrates the reflectivity as a function of wavelength and shows two Bragg wavelengths $\lambda_{Bragg1}$ and $\lambda_{Bragg2}$. In the following, the sensitivity of the spectral distance between these two wavelengths to temperature or to pressure is referred to as "differential sensitivity".

Figure 2:
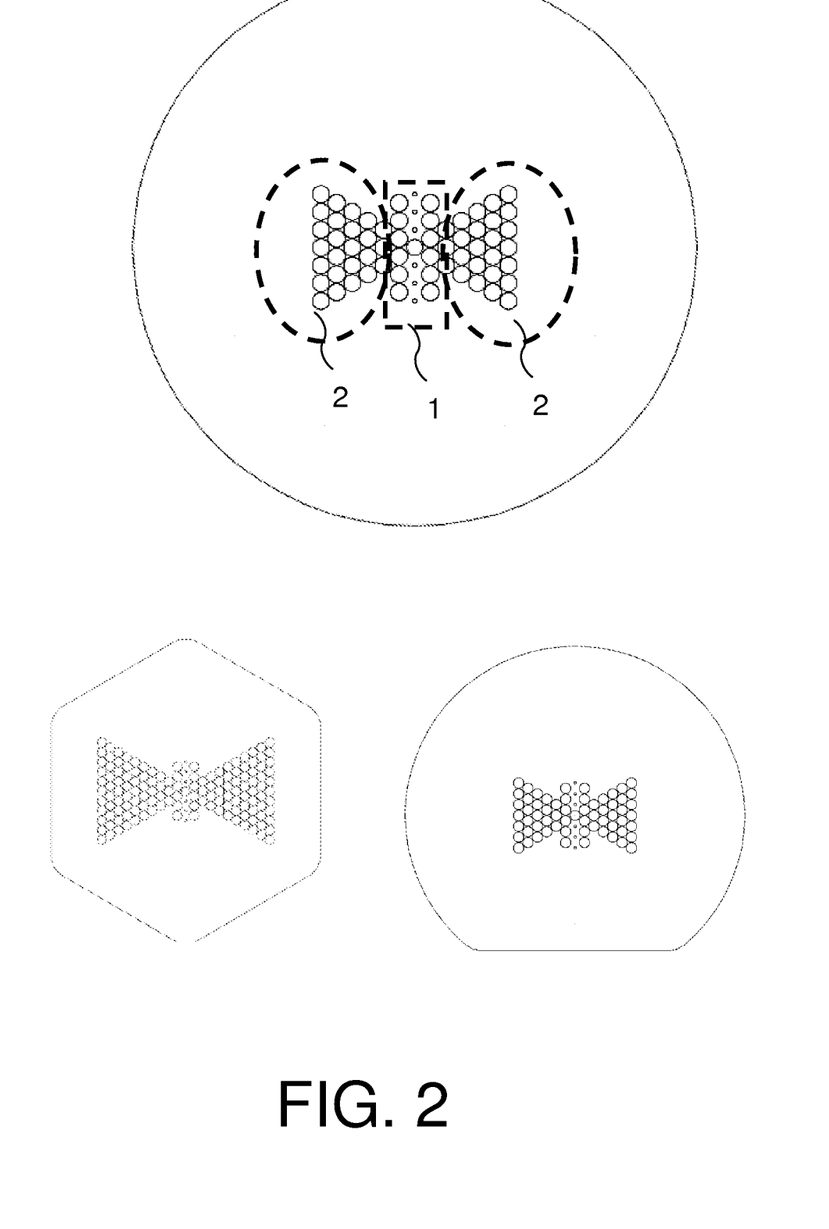
FIG. 2 shows a layout of a plurality of holes for a microstructured cladding design according to a second preferred embodiment of the invention.

FIG. 2 shows a layout of a plurality of holes for the first type of a microstructured fiber structure according to a second preferred embodiment of the invention. The fiber structure comprises a doping level of 2.8 to 3, e.g. 2.88% mol germanium-doped inclusion: $\Lambda=3.5$-$4.0$ μm, a value for the diameter small holes of $d_1/\Lambda=0.2$ to 0.3 e.g. 0.225 and a value for the diameter large holes of $d_2/\Lambda=0.95$ and a value for the diameter of the doped region $d_{core}/\Lambda=0.9$. According to other preferred embodiments of the invention, the fiber structure comprises 2.9% mol or 3% mol germanium-doped inclusion and/or a value for the diameter small holes of $d_1/\Lambda$ around 0.2. A suitable range is 2 to 7 mol %.

The differential temperature sensitivity for an FBG at a wavelength of 1.55 μm in bare uncoated fiber comprises a value of 0.0 pm/K. Technologically, such a perfect zero value for sensitivity is hard to achieve but the real value is preferably below 0.01 pm/K, which is below the resolution of most of fiber Bragg grating interrogation units, when 100 K temperature variations are assumed. The zero differential temperature sensitivity for an FBG is achieved at the wavelength of 1.55 μm. A pressure sensitivity for an FBG at the wavelength of 1.55 μm comprises a value of 10 pm/MPa for 6 rings of holes or more then 30 pm/MPa for 10 rings of holes. The birefringence at a wavelength of 1.55 μm comprises a value of $8.9 \times 10^{-4}$.

As shown in FIG. 2, the central part of the microstructure, also referred to as central microstructure 1, comprises three rows of air-holes. The middle row comprises a plurality of air-holes with a smaller diameter adapted for making the fiber to behave as a single mode fiber by making higher order modes much more lossy than lower order modes. The two outer rows which are neighboring the middle row comprise larger holes allowing a high confinement of light into the fiber core. The region around the core of the fiber bounded by the smaller diameter holes and the larger holes guides the optical radiation through the fiber. The term "guiding optical radiation", refers for example, to the central holey structure transmitting about 99% or more, e.g. 99.99% of the light transferred along the optical fiber. In particular a central region bordered by at least some of the holes of the central microstructure defines a transmission pathway for about 99% or more, e.g. 99.99% of the light transferred along the optical fiber. Depending on the number of rings of regions with a lower refractive index, such as air, such a design shows a considerable improvement in pressure sensitivity. As indicated above the pressure sensitivity increases from 10 pm/MPa for 6 rings of holes up to 30 pm/MPa for 10 rings of holes at 1.55 μm. The upper part in FIG. 2 illustrates a circular cladding, whereas the lower left part in FIG. 2 shows a hexagonal-like cladding and the lower right part in FIG. 2 a D-shaper cladding, respectively. It is noted that the central microstructure 1 is at least partly arranged in the doped region of the fiber structure.

The range of the geometric parameters and the range of specifications are indicated in table 1 and table 2, respectively.

TABLE 1

| Parameter | Minimum | Maximum | Typical |
| --- | --- | --- | --- |
| Pitch distance Λ | 1 μm | 10 μm | 3-4 μm |
| Diameter small holes $d_1/\Lambda$ | 0.1 | 0.5 | 0.2-0.4 |
| Diameter large holes $d_2/\Lambda$ | 0.4 | 0.99 | 0.95-0.99 |
| Diameter doped region $d_{core}/\Lambda$ | 0.1 | 0.99 | 0.8-0.9 |
| Shape of the doped region (ellipticity) | 0.1 | 1 | 1 |
| Dopant concentration | 0 mol % | 35 mol % | 2.5-3.0 mol % |
| Number of rings of holes | 1 | 20 | 6-10 |
| Fiber diameter | 40 μm | 250 μm | 80-125 μm |
| Possible outer shapes of fiber cross section | D-shape like, elliptical, circular or hexagonal-like or any other | | |

TABLE 2

| Parameter | Minimum | Maximum | Typical |
| --- | --- | --- | --- |
| Phase modal birefringence B | $1 \times 10^{-4}$ | $1 \times 10^{-2}$ | $1 \times 10^{-3}$ |
| Absolute value of polarimetric hydrostatic pressure sensitivity [rad/(m*MPa)] | 1 | 100 | 30-50 |
| Absolute value of polarimetric temperature sensitivity | $1 \times 10^{-4}$ | 1 | $1 \times 10^{-2}$ to $1 \times 10^{-1}$ |

TABLE 2-continued

| Parameter | Minimum | Maximum | Typical |
| --- | --- | --- | --- |
| Absolute value of Bragg peak separation sensitivity to hydrostatic pressure [pm/MPa] | 0.1 | 50 | ~10 or 20 |
| Absolute value of Bragg peak separation sensitivity to temperature [pm/K] | 0 | 10 | <0.01 |

Figure 3:
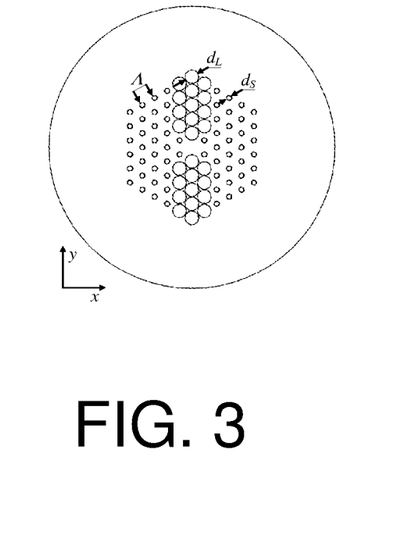
FIG. 3 shows a layout of a plurality of holes for a microstructured fiber according to a third preferred embodiment of the invention (no doped core region is shown for clarity reasons)

FIG. 3 shows a layout of a plurality of holes for the first fiber structure according to a third preferred embodiment of the invention. The fiber structure comprises a value of Λ=3.5 μm, a diameter for the small holes of $d_1/\Lambda=0.40$, indicated as $d_S$ in FIG. 3, and a diameter for the large holes of $d_2/\Lambda=0.95$, indicated as $d_L$ in FIG. 3, with 9 layers of holes surrounding the core. The region around the core of the fiber is bounded by the larger holes and the small holes. It is this region that guides the optical radiation. The region around the core of the fiber bounded by the smaller diameter holes and the larger holes guides the optical radiation through the fiber. The term "guiding optical radiation", refers for example, to the central holey structure transmitting about 99% or more, e.g. 99.99% of the light transferred along the optical fiber. In particular a central region bordered by at least some of the holes of the central microstructure defines a transmission pathway for about 99% or more, e.g. 99.99% of the light transferred along the optical fiber.

According to the third preferred embodiment of the invention, two different fiber types of the first fiber structure have been investigated.

Firstly, a fiber core with 3% mol circular doped inclusion of $d_{core}/\Lambda=0.8$ and a differential temperature sensitivity for an FBG at λ=1.55 μm for a bare uncoated fiber with a value of 0.0052 pm/K. The zero differential temperature sensitivity for an FBG is achieved at a wavelength of 1.38 μm. The polarimetric pressure sensitivity at 1.55 μm comprises a value of −28 rad/MPa/m for 6 rings of holes and −38 rad/MPa/m for 9 rings of holes, respectively. With a feasible technology, the value of the polarimetric pressure sensitivity is further increased to a level of about −45 rad/MPa/m by enlarging selected holes in the cladding, such as for 11 rings of air holes. The value for the birefringence at 1.55 μm corresponds to $7.7 \times 10^{-4}$, the confinement losses at 1.55 μm are smaller than 0.01 dB/m and the bending losses at 1.55 μm for a curvature with a diameter of 5 mm is also smaller than 0.01 dB per half loop.

Secondly, the other type of the first fiber structure comprises a value of 7% mol circular doped inclusion with a value of $d_{core}/\Lambda=0.6$. The differential temperature sensitivity for an FBG at 1.55 μm comprises a value of −0.0056 pm/K. The zero differential temperature sensitivity is achieved at 1.7 μm. The polarimetric pressure sensitivity comprises a value of −36 rad/MPa/m at 1.55 μm. With a feasible technology, the value of the polarimetric pressure sensitivity is further increased to a level of about −45 rad/MPa/m by enlarging selected holes in the cladding, such as for 11 rings of air holes. The birefringence is similar to the first case and corresponds to a value of $7.6 \times 10^{-4}$. Furthermore, the confinement losses and the bending losses show the same values as in the first case.

The range of geometric parameters and the range of specifications are indicated in tables 3 and 4, respectively.

TABLE 3

| Parameter | Minimum | Maximum | Typical |
| --- | --- | --- | --- |
| Pitch distance Λ | 1 μm | 10 μm | 3-4 μm |
| Diameter small holes $d_1/\Lambda$ | 0.1 | 0.6 | 0.3-0.5 |
| Diameter large holes $d_2/\Lambda$ | 0.4 | 0.99 | 0.95-0.99 |
| Diameter doped region $d_{core}/\Lambda$ | 0.1 | 0.99 | 0.6-0.8 |
| Shape of the doped region (ellipticity) | 0.1 | 1 | 1 |
| Dopant concentration | 0 mol % | 35 mol % | 3-7 mol % |
| Number of rings of holes | 1 | 20 | 9 |
| Fiber diameter | 40 μm | 250 μm | 80-125 μm |
| Possible outer shapes of fiber cross section | D-shape like, elliptical, circular or hexagonal-like or any other | | |

TABLE 4

| Parameter | Minimum | Maximum | Typical |
| --- | --- | --- | --- |
| Phase modal birefringence B | $1 \times 10^{-4}$ | $1 \times 10^{-2}$ | $1 \times 10^{-3}$ |
| Absolute value of polarimetric hydrostatic pressure sensitivity [rad/(m*MPa>)] | 1 | 100 | 20-40 |
| Absolute value of polarimetric temperature sensitivity | $1 \times 10^{-4}$ | 1 | $1 \times 10^{-2}$ to $1 \times 10^{-1}$ |
| Absolute value of Bragg peak separation sensitivity to hydrostatic pressure [pm/MPa] | 0.1 | 10 | — |
| Absolute value of Bragg peak separation sensitivity to temperature [pm/K] | 0 | 10 | <0.01 |

Figure 4:
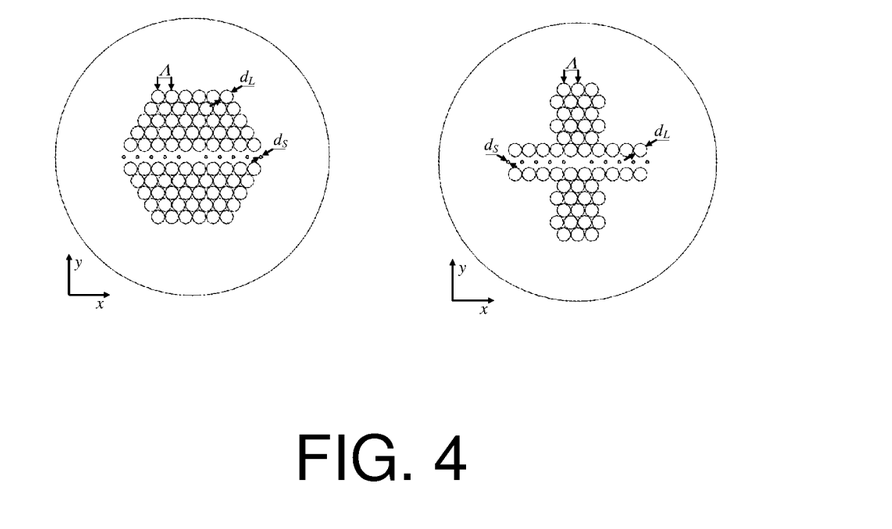
FIG. 4 shows a layout of a plurality of holes for a microstructured fiber according to a fourth preferred embodiment of the invention (no doped core region is shown for clarity reasons)

FIG. 4 shows a layout of a plurality of holes for a microstructured fiber structure according to the fourth preferred embodiment of the invention. These types can also be used for sensor applications. There is a central row of smaller holes surrounded by side regions of larger sized holes. The region around the core of the fiber, bounded by the smaller diameter holes and the larger holes, guides the optical radiation through the fiber. The term "guiding optical radiation", refers for example, to the central holey structure transmitting about 99% or more, e.g. 99.99% of the light transferred along the optical fiber. In particular a central region bordered by at least some of the holes of the central microstructure defines a transmission pathway for about 99% or more, e.g. 99.99% of the light transferred along the optical fiber.

Figure 5:
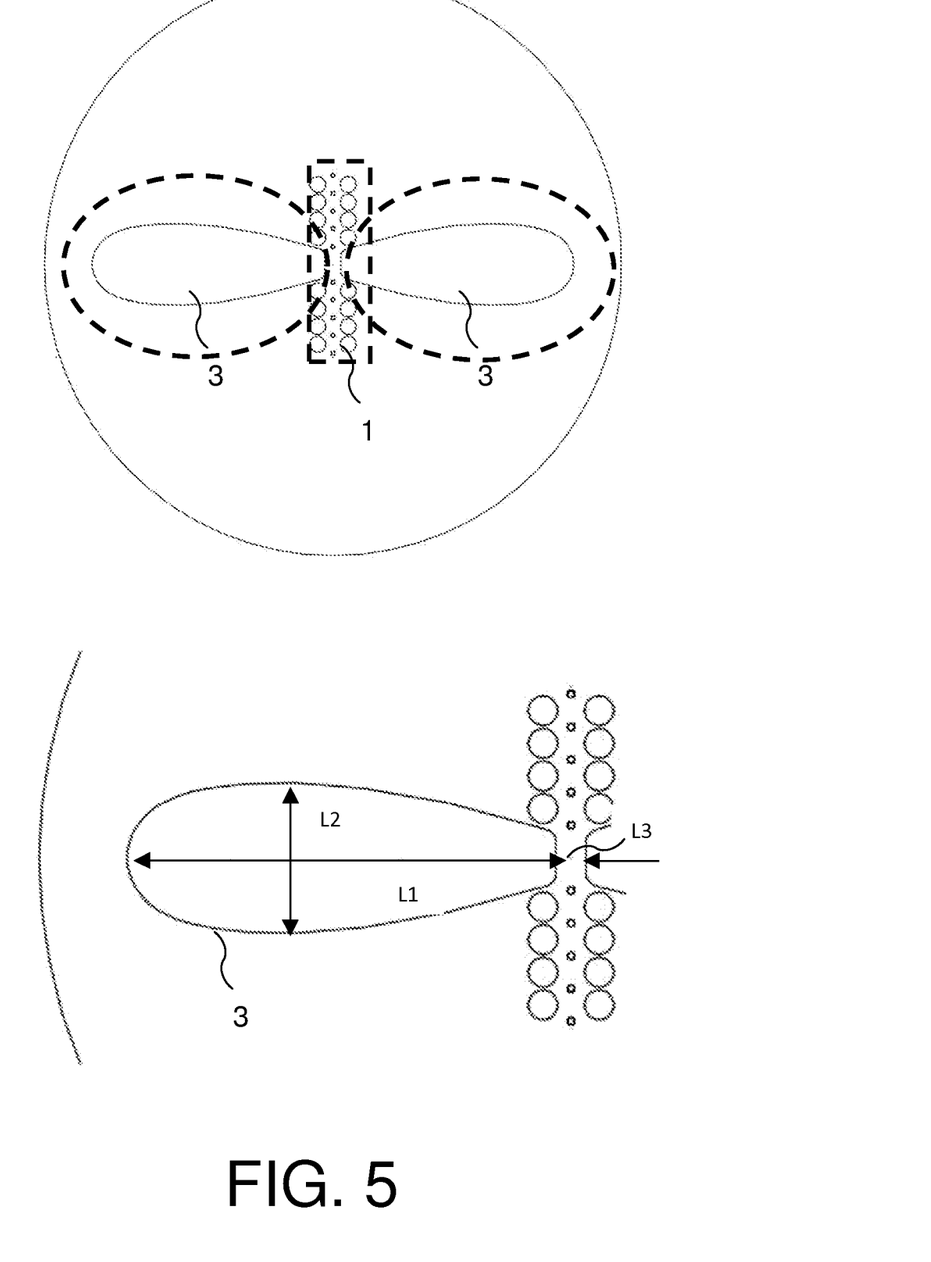
FIG. 5 shows a schematic cross-section of a microstructured fiber with side-holes according to a fifth preferred embodiment of the invention (no doped core region is shown for clarity reasons)

FIG. 5 shows a schematic drawing of a microstructured fiber comprising two side-holes according to a fifth preferred embodiment of the invention. This second fiber structure comprises a central microstructure 1 and a macrostructure 3. The central microstructure 1 is adapted for determining the optical properties of the light, which is guided in the core of the fiber region. The macrostructure 3 is adapted for determining the hydrostatic pressure sensitivity or the transversal line load sensitivity of the fiber structure.

The central microstructure 1 comprises three rows of airholes. The row in the middle comprises a plurality of air-holes with a smaller diameter, which is adapted to make the fiber structure behave as single mode fiber. This is achieved by making the higher order modes much more lossy than the lower order modes. The two rows comprising a plurality of larger holes are adapted for determining the confinement losses. In those rows comprising larger air-holes, the macrostructure 3 replaces two or more of the air-holes in that row. It is preferred that the side-holes are arranged very close to the fiber core.

The region around the core of the fiber, bounded by the smaller diameter holes and parts of the large macrostructure holes, guides the optical radiation through the fiber. The term "guiding optical radiation", refers for example, to the central holey structure transmitting about 99% or more, e.g. 99.99% of the light transferred along the optical fiber. In particular a central region bordered by at least some of the holes of the central microstructure defines a transmission pathway for about 99% or more, e.g. 99.99% of the light transferred along the optical fiber.

Depending on the nearest distance from the core region to the macrostructure 3, the macrostructure 3 is adapted for setting the phase modal birefringence of the fiber structure. However, the macrostructure 3 can also be adapted for setting the pressure sensitivity of the fiber structure. According to the fifth preferred embodiment of the invention, the macrostructure 3 replaces a part of the central microstructure 1. The shape of the side-holes in the macrostructure 3 comprises a shape corresponding to an elliptical, a rectangular, a circular or an even more exotic shape. The shape of the side-hole in the macrostructure 3 near the fiber core is chosen in such a way that the confinement losses are as low as possible.

The nearest distance from the edge of the macrostructure 3 to the fiber core, indicated as L3 and L2 in FIG. 5, and the largest distance between two points on the edge of the macrostructure 3, indicated as L1, are adapted for determining the sensitivity level. In addition, the length L3 also determines the phase modal birefringence and the confinement losses and thus this length cannot be endlessly minimized. The size of L1 should be as large as possible, only limited by the fabrication technology and possibly by the splice conditions. Usually, the size of the length L2 is smaller than that of the length L1, although circular holes are also possible or even air-holes with L2 larger than L1. The length L2 shows an impact on the sensitivity level but this role is much less important in that of L1.

The range of geometric parameters and the range of specifications are indicated in tables 5 and 6, respectively.

TABLE 5

| Parameter | Minimum | Maximum | Typical |
| --- | --- | --- | --- |
| Pitch distance Λ | 1 μm | 10 μm | 3-4 μm |
| Diameter small holes $d_1/\Lambda$ | 0.1 | 0.4 | 0.22 |
| Diameter large holes $d_2/\Lambda$ | 0.4 | 0.99 | 0.95 |
| Diameter doped region $d_{core}/\Lambda$ | 0.1 | 0.99 | 0.9 |
| Shape of the doped region (ellipticity) | 0.1 | 1 | 1 |
| Dopant concentration | 0 mol % | 35 mol % | 3-7 mol % |
| largest distance between two points on the edge of the macrostructure L1/(fiber diameter) | 1% | 49% | 35% |

TABLE 5-continued

| Parameter | Minimum | Maximum | Typical |
|---|---|---|---|
| lateral dimension of the macrostructure, perpendicular to the first dimension L2/(fiber diameter) | 1% | 49% | 10% |
| separation of the two parts of the macrostructure over the fiber's core region L3/Λ | 50% | 150% | 100% |
| Number of rings of holes | 1 | 20 | 6-10 |
| Fiber diameter | 40 μm | 250 μm | 80-125 μm |

TABLE 6

| Parameter | Minimum | Maximum | Typical |
|---|---|---|---|
| Phase modal birefringence B | $1 \times 10^{-4}$ | $1 \times 10^{-2}$ | $1 \times 10^{-3}$ |
| Absolute value of Polarimetric hydrostatic pressure sensitivity [rad/(m*MPa)] | 1 | 150 | 50-100 |
| Absolute value of Polarimetric temperature sensitivity | $1 \times 10^{-4}$ | 1 | $1 \times 10^{-2}$ to $1 \times 10^{-1}$ |
| Absolute value of Bragg peak separation sensitivity to hydrostatic pressure [pm/MPa] | 0.1 | 20 | 15 |
| Absolute value of Bragg peak separation sensitivity to temperature [pm/deg C.] | 0 | 10 | <0.01 |

Both presented fiber structures comprise a microstructure incorporating two functions: The part of the microstructure that lies close to the core region is adapted for contributing to the value of the phase modal birefringence B and, most importantly, to the differential temperature sensitivity of an FBG in the fiber. The outer part of the microstructure is designed to enhance the hydrostatic pressure sensitivity or the transversal load sensitivity of the fiber's birefringence and, at the same time, the differential hydrostatic pressure sensitivity or the transversal load sensitivity of an FBG in the fiber.

Figures 6A, 6B:
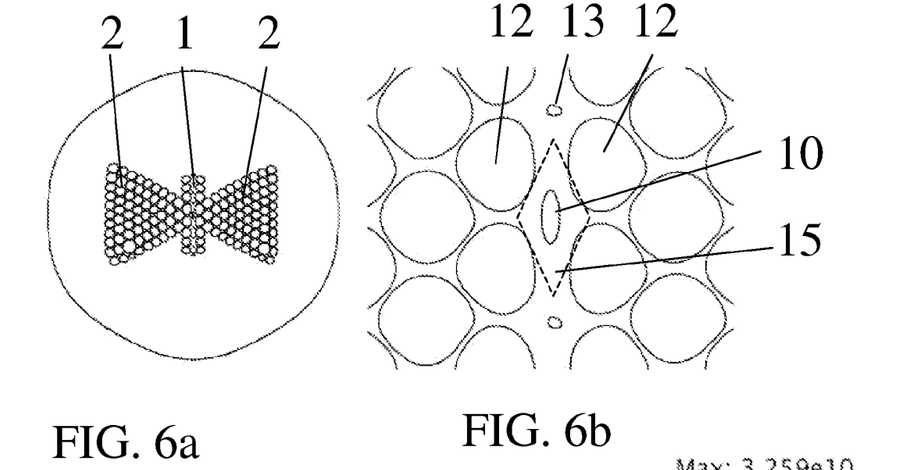
FIG. 6a shows a schematic drawing of a microstructured fiber with side-holes similar to that shown in FIG. 2.
FIG. 6b shows a close-up of the holes close to the central core of the fiber.
Figure 6C:
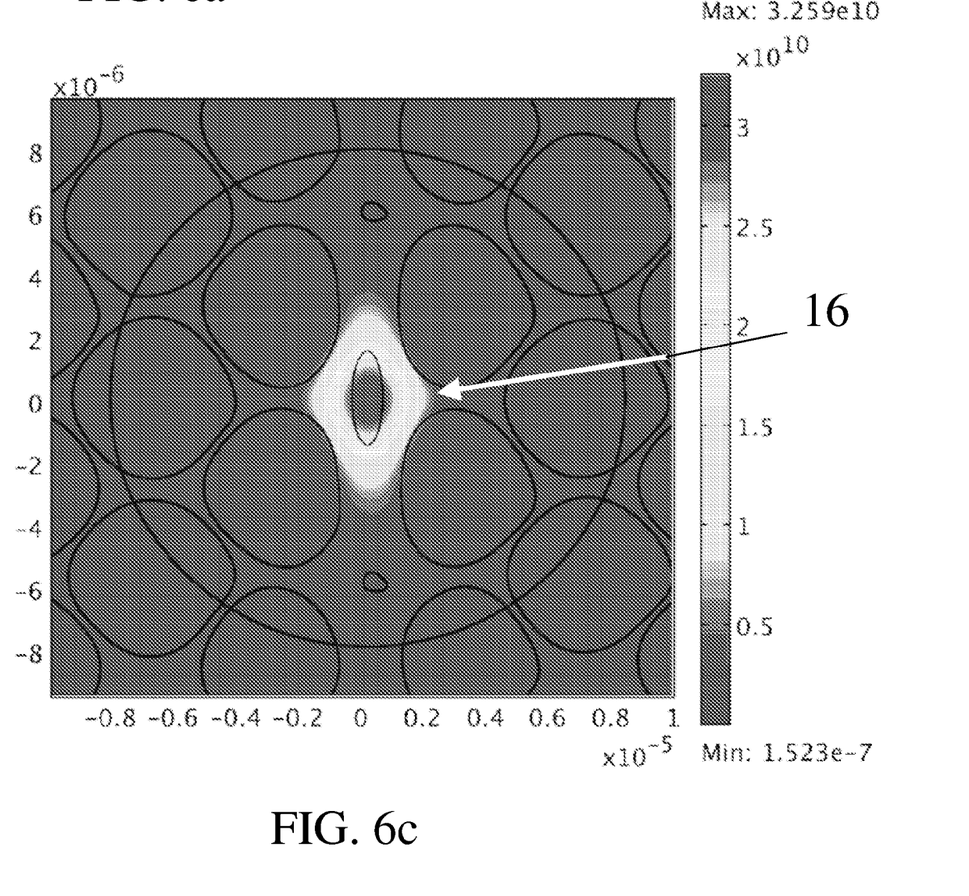
FIG. 6c shows the simulated electric field distribution of the slow mode concentrated in the fiber around the central core region.

FIG. 6a shows a cross-section through an optical fiber similar to that shown in FIG. 2. It comprises a central microstructure region 1 and two large side holey structures 2 which are in this case microstructures. FIG. 6b shows a close-up of a region 15 about the core 10 which is bounded by four of the holes 12 of the central microstructure and two smaller holes 13 that influence the optical propagation modes. The region 15 of the fiber around the core has a shape like a lozenge and is bounded by the four holes 12 and the two smaller holes 13. The lozenge has an elongated shape, i.e. long axis vertical in the figure, "the slow axis". This shape has an effect on the light propagation in this central region. As shown in FIG. 6c the light is guided within this central region and the shape 16 of the transmitted beam is elongated in the same direction as the elongated shape of the central fiber region 15. The term "guiding optical radiation", refers for example, to the central holey structure transmitting about 99% or more, e.g. 99.99% of the light transferred along the optical fiber. In particular a central region bordered by at least some of the holes of the central microstructure defines a transmission pathway for about 99% or more, e.g. 99.99% of the light transferred along the optical fiber.

Figure 7A:
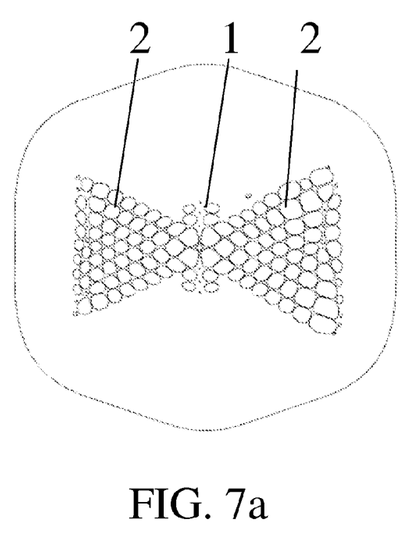
FIG. 7a shows a schematic drawing of a microstructured fiber with side-holes similar to that shown in FIG. 2.
Figure 7B:
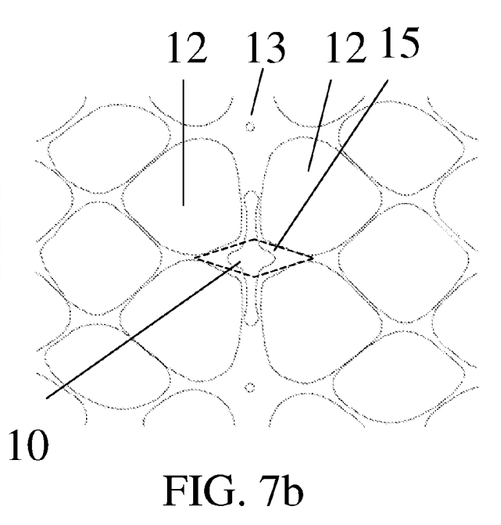
FIG. 7b shows a close-up of the holes close to the central core of the fiber.
Figure 7C:
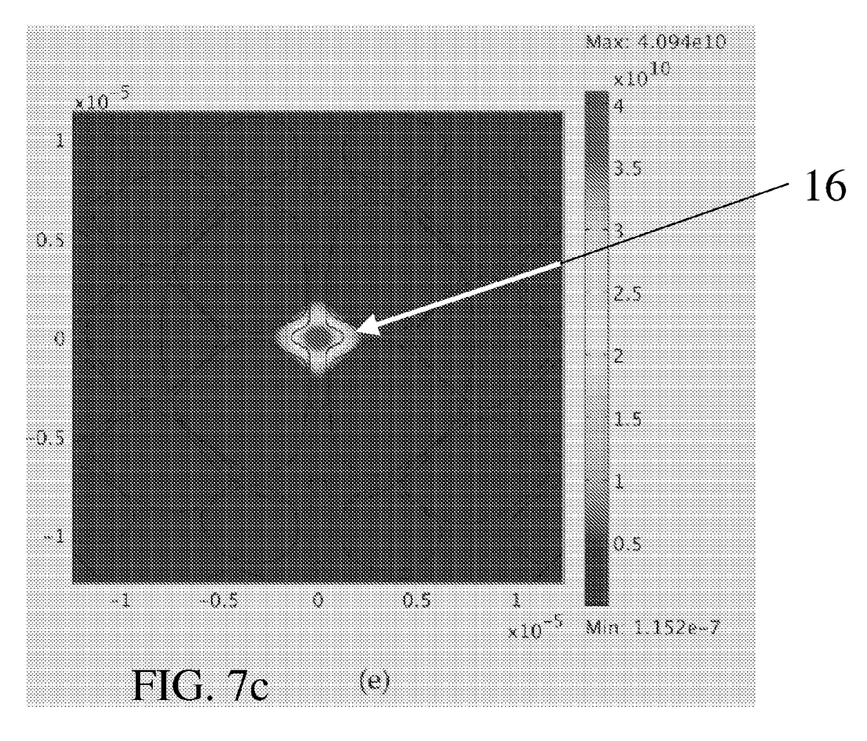
FIG. 7c shows the simulated electric field distribution of the slow mode concentrated in the fiber around the central core region.

FIG. 7a shows a cross-section through an optical fiber similar to that shown in FIG. 2. It comprises a central microstructure region 1 and two large side holey structures 2 which are in this case microstructures. FIG. 7b shows a close-up of a region 15 about the core 10 which is mainly bounded by four of the holes 12 or the central microstructure. The two smaller holes 13, that influence the optical propagation modes, are further away and have less of an effect. The region 15 of the fiber around the core has a shape of a lozenge and is bounded mainly by the four holes 12 and has an elongated shape, namely the longer axis is horizontal in the figure (the slow axis). This shape has an effect on the light propagation in this central region 15. As shown in FIG. 7c the light is guided within this central region and the shape 16 of the transmitted beam is elongated in the same direction as the elongated shape of the central fiber region 15. The term "guiding optical radiation", refers for example, to the central holey structure transmitting about 99% or more, e.g. 99.99% of the light transferred along the optical fiber. In particular a central region bordered by at least some of the holes of the central microstructure defines a transmission pathway for about 99% or more, e.g. 99.99% of the light transferred along the optical fiber.

The MOF of FIG. 6 in practice contained a germanium-doped core ($GeO_2$ was 7.4 mol %) in a nearly elliptical shape, with major axis parallel to the vertical direction in FIG. 6 (slow axis).

MOF of FIG. 7 had a shape of the core region (doped $GeO_2$ at 2.4 mol %) whereby the slow axis no longer corresponds to the vertical but to the horizontal axis of FIG. 6.

In both cases the doping level in these fibers lies close to an optimal value of 2.88 mol %, i.e. in the range 2 to 8 mol %. Hence a very low temperature sensitivity for the Bragg peak separation is obtained.

Figure 8:
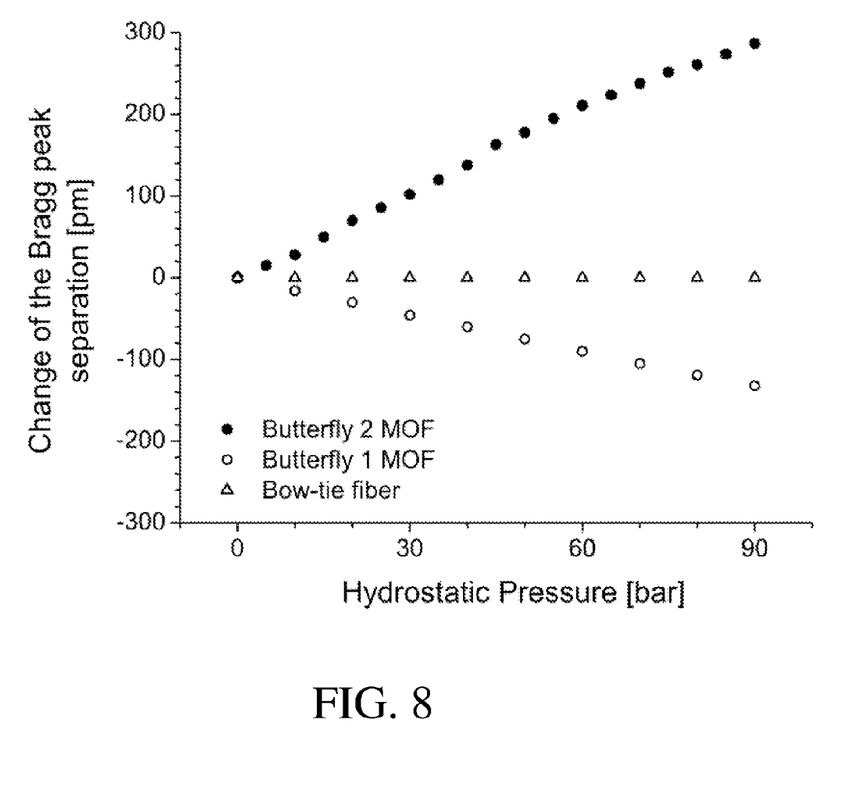
FIG. 8 shows a graph of the change of the Bragg peak separation as a function of hydrostatic pressure for an FBG in a conventional birefringent fiber (Bow-tie) and for an FBG in fibers according to embodiments of the present invention (Butterfly 1 Butterfly 2).

FIG. 8 shows the sensitivity to hydrostatic pressure for the optical fibers shown in FIG. 6a (Butterfly 1) and in FIG. 7a (Butterfly 2) as well as a know design (Bow-Tie). The Butterfly 1 MOF has a pressure sensitivity that is 25 times higher than conventional highly birefringent fibers.

Thus the microstructure of embodiments of the present invention succeed in increasing the transverse sensitivity. The Butterfly 2 MOF has a pressure sensitivity that is more than twice that of Butterfly 1. Butterfly 1 has a negative coefficient with increasing pressure and Butterfly 2 has a positive coefficient while still maintaining the low temperature sensitivity in both cases. Thus an aspect of the present invention is to control the sign of the coefficient of sensitivity to pressure depending upon the arrangement of the holes around the central region about the core and the shape of the fiber as bounded by these holes. The differences in this shape have been described above with reference to FIGS. 6b and 7b. Hence, in accordance with any of the embodiments of the present invention a central microstructure can be optimized (or designed) to choose the direction of the slow axis with respect to the side holey structures such as side microstructures or side macrostructures with the result of tailoring the sensitivity of the Bragg peak wavelengths that correspond to the slow and fast axes for an FBG in that fiber and/or to determine the sign of the differential Bragg peak sensitivity. As described above fabricated fibers with both a negative and positive differential Bragg peak sensitivity have been described. The pressure sensing mechanism that stems from the asymmetric microstructure of embodiments of the present invention has the same orientation for both of the fibers of FIGS. 6 and 7. The hydrostatic pressure sensitivity of the Bragg peak separation is negative for the fiber of FIG. 6 and positive for the fiber of FIG. 7. Positive sensitivity makes high pressure sensing more liable because there is no longer any risk for the two Bragg peaks to overlap. This embodiment which relates to the control of the sign of the coefficient of sensitivity to pressure depending upon the arrangement of the holes around the central region about the core and the shape of the fiber as bounded by these holes can be applied to the fibers of FIG. 2 or FIG. 3 or FIG. 4 or FIG. 5.

Accordingly, it has been found that for embodiments of the present invention it is possible to compensate the differential thermal FBG sensitivity with a thermal stress sensitivity that depends on the germanium dioxide doping level in the doped region and the shape of the doped region in the core, respectively. Numerical simulations have shown that reasonable doping levels in the range of 2 to 7 mol %, depending on the exact microstructure, result in zero differential temperature sensitivity for an FBG in the highly birefringent microstructured fiber designs presented in this application.

It has also been found that there is also a contribution of the dispersion of the birefringence to the overall sensitivity in addition to the polarimetric sensitivity in the overall sensitivity. Hence, microstructured fibers or fiber structures require a doped region to compensate for this contribution. This also means that other fibers than pure silica fibers can be temperature insensitive as well.

Besides optimizing the doped region to obtain zero differential temperature sensitivity for an FBG in such a fiber, the microstructure and the doped region can be tailored to reach a desired non-zero sensitivity. Besides, the use of FBGs in doped fibers instead of in pure silica fibers brings a number of practical advantages, such as that conventional UV laser FBG writing techniques can be used for the fabrication of the FBGs in these microstructured fiber structures. It goes without saying that pure silica fibers show no UV photosensitivity. Therefore, the manufacturing of sensor FBGs in microstructured fibers becomes possible as the photosensitivity is large enough to start fabricating draw-tower FBGs in the microstructured fiber structures. Additionally, the inclusion of germanium doping is beneficial to the confinement losses, the splice losses and the inscription of fiber Bragg gratings.

It is worth noting that the differential pressure sensitivity of an FBG in the fiber structure mostly depends on the architecture or design of the side or surrounding microstructure or macrostructure, while the differential temperature sensitivity mainly depends on the geometry of the microstructure in the close vicinity of the core region. Therefore it becomes possible, to design the microstructured fiber structure for a high pressure sensitivity in conjunction with a desired, such as very low, temperature sensitivity.

The side or surrounding microstructure comprises a plurality of air-holes. Usually, the air-holes in this part of the microstructure show the same diameter as the large holes in the central part of the microstructure. The pattern of the air-holes is chosen so that the hydrostatic pressure sensitivity is favorable. Due to the fact that its sensitivity depends mostly on the filling factor of the large holes and on the number of rings, 10 rings of holes over one with only 6 rings is to be preferred, although this might imply that the circular shape of the cladding has to be sacrificed for a hexagonal shape and that this might require an extra effort for the fiber fabrication, respectively.

The microstructured cross section of the fiber structure does not compromise the ability to inscribe FBGs in such a fiber structure with conventional UV inscription techniques. Ideally, the microstructure is relatively simple, at least for certain orientations, which should also allow "unconventional" FBG inscription such as femtosecond laser grating fabrication.

Furthermore, according to other preferred embodiments of the invention, such a fiber structure comprises a flat side on the cladding which can be used for visual alignment purposes or for assisting the fiber Bragg grating inscription.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A fiber structure comprising:
   a core and a cladding surrounding the core;
   a central microstructure comprising a first plurality of longitudinal holes, wherein the central microstructure is configured for guiding optical radiation and providing an initial level of birefringence in the core via geometrical birefringence;
   a side holey structure comprising a second plurality of longitudinal holes, wherein the side holey structure is at least partly surrounding the central microstructure and is configured for providing a predetermined anisotropic response to pressure;
   a doped region in the core; and
   a birefringence responsive unit comprising at least one fibre grating arranged at least partly in the core, and being configured for converting the birefringence in the core to wavelength information,
   wherein the first and/or the second plurality of longitudinal holes comprise(s) a circular cross section, an elliptical cross section, a ring-like cross section or a hexagonal cross section and is/are configured for obtaining at least one of a predetermined birefringence, a predetermined pressure sensitivity, a predetermined force sensitivity, a predetermined temperature sensitivity, a predetermined ratio of pressure sensitivity and temperature sensitivity, and a predetermined ratio of force sensitivity and temperature sensitivity.

2. The fiber structure according to claim 1, wherein said side holey structure is configured for providing a predetermined anisotropic response to isotropic pressure, or a transverse load that is perpendicular to a fiber axis.

3. The fiber structure according to claim 1, wherein said birefringence responsive unit is configured for converting the birefringence in the core into Bragg peak separation information.

4. The fiber structure according to claim 1, wherein said wavelength information comprises a distance in wavelength $\Delta\lambda$ between two reflection peaks of said at least one fiber grating written in such a fiber structure.

5. The fiber structure according to claim 1, further comprising a plurality of gratings arranged at least partially in the core.

6. The fiber structure according to claim 1, wherein the side holey structure is a side microstructure.

7. A fiber structure according to claim 1, wherein the side holey structure is a macrostructure.

8. A fiber structure of claim 1, wherein a central region bordered by at least some of the holes of the central structure defines a transmission pathway for 99% or more of the optical radiation transferred along the optical fiber.

9. The fiber structure according claim 1, wherein the central micro structure comprises at least one row of air holes, preferably three rows of air holes arranged next to one another, wherein the diameter of the middle row is smaller than the diameter of the two outer rows.

10. The fiber structure according to claim 9, wherein the central micro structure comprises three rows of air holes and wherein the middle row comprises a plurality of air-holes with a smaller diameter adapted for making the fiber to behave as a single mode fiber by making higher order modes much more lossy than lower order modes, and wherein the two outer rows which are neighboring the middle row comprise larger holes allowing a high confinement of light into the fiber core.

11. The fiber structure according to claim 1, wherein the birefringence responsive unit is a fiber Bragg grating.

12. The fiber structure according to claim 1, wherein the first plurality of longitudinal holes is arranged such that their longitudinal axes are parallel relative to the longitudinal axis of the core.

13. The fiber structure according claim 1, wherein at least a portion out of the first and/or second plurality of longitudinal holes comprises same sizes and/or same shapes.

14. The fiber structure according to claim 7, wherein the macrostructure comprises at least two side-holes arranged opposite to each other and is configured for determining the phase modal birefringence of the fiber structure.

15. The fiber structure according to claim 14, wherein the shape of the two side-holes is configured for reducing confinement losses and is chosen from a shape comprising an elliptical, a rectangular and/or a circular shape.

16. The fiber structure according to claim 6, wherein the cladding comprises an inner cladding and an outer cladding, the inner cladding providing circular features and the outer cladding providing features different from circular features.

17. The fiber structure according to claim 1 having a central microstructure that determines the direction of the slow axis of the optical fiber with respect to the side holey structure with a sensitivity of the Bragg peak wavelengths that correspond to the slow and fast axes for an fiber Bragg grating in that fiber, the fiber structure having a positive or negative sign of the differential Bragg peak sensitivity.

18. A method of use of a fiber structure according to claim 1 with fiber Bragg gratings in at least one of the following sensor applications:
   structural health monitoring of composite material structures, such as in aircraft structures; and
   monitoring of pressure and strain in the presence of ionizing radiation.

19. A method of producing an optical fiber further comprising the steps of
   fabricating a core comprising a doped region and a cladding surrounding the core, a central microstructure comprising a first plurality of longitudinal holes, wherein the central microstructure is adapted for guiding optical radiation and providing an initial level of birefringence in the core via geometrical birefringence, a side holey structure comprising a second plurality of longitudinal holes, wherein the side holey structure is at least partly surrounding the central microstructure and is adapted for providing a predetermined anisotropic response to pressure and a birefringence responsive unit comprising at least one fiber grating arranged at least partly in the core,
   wherein fabricating the central microstructure comprises adapting the central microstructure and the core to determine the direction of the slow axis of the optical fiber with respect to the holey side structure, with the result of at least one of tailoring the sensitivity of the Bragg peak wavelengths that correspond to the slow and fast axes for said fiber grating in that fiber and determining the sign of the differential Bragg peak sensitivity to pressure, and wherein fabricating the central microstructure comprises doping the core according to a predetermined doping level in order to control the differential Bragg peak sensitivity to temperature, and
   wherein the first and/or the second plurality of longitudinal holes comprise(s) a circular cross section, an elliptical cross section, a ring-like cross section or a hexagonal cross section and is/are configured for obtaining at least one of a predetermined birefringence, a predetermined pressure sensitivity, a predetermined force sensitivity, a predetermined temperature sensitivity, a predetermined ratio of pressure sensitivity and temperature sensitivity, at a predetermined ratio of force sensitivity and temperature sensitivity.

20. The fiber structure according to claim 1, wherein said second plurality of longitudinal holes in the side holey structure comprises more than two longitudinal holes.

21. The fiber structure according to claim 1, wherein said doped region in the core has a doping level configured to provide a predetermined differential temperature sensitivity of said fiber structure, the differential temperature sensitivity being the sensitivity of the spectral distance between said reflection peaks to temperature.

22. The fiber structure according to claim 21, wherein said predetermined differential temperature sensitivity is a zero differential temperature sensitivity and wherein said doped region in the core comprises a doping level of Germanium dioxide within the range of 2 to 35 mol %.

23. The fiber structure according to claim 1, wherein said doped region in the core comprises a doping level of Germanium dioxide greater than 7 mol %.

24. The fiber structure according to claim 1, wherein said doped region in the core comprises a doping level of Germanium dioxide within the range of 2 to 7 mol % or within the range of 8 to 35 mol %.

25. A fiber structure comprising:
   a core and a cladding surrounding the core;
   a central microstructure comprising a first plurality of longitudinal holes, wherein the central microstructure is configured for guiding optical radiation and providing an initial level of birefringence in the core via geometrical birefringence;
   a side holey structure comprising a second plurality of longitudinal holes, wherein the side holey structure is at least partly surrounding the central microstructure and is configured for providing a predetermined anisotropic response to pressure;
   a doped region in the core; and
   a birefringence responsive unit comprising at least one fibre grating arranged at least partly in the core, and being configured for converting the birefringence in the core to wavelength information,
wherein a center-to-center distance between adjacent holes in the first or second plurality of longitudinal holes is between 1 and 10 µm.

26. The fiber structure according to claim 25, wherein the side holey structure comprises at least two parts that are separated over the core by a length of 50% of the pitch distance.

27. A fiber structure comprising:
a core and a cladding surrounding the core;
a central microstructure comprising a first plurality of longitudinal holes, wherein the central microstructure is configured for guiding optical radiation and providing an initial level of birefringence in the core via geometrical birefringence;
a side holey structure comprising a second plurality of longitudinal holes, wherein the side holey structure is at least partly surrounding the central microstructure and is configured for providing a predetermined anisotropic response to pressure;
a doped region in the core; and
a birefringence responsive unit comprising at least one fibre grating arranged at least partly in the core, and being adapted configured for converting the birefringence in the core to Bragg peak separation information,
wherein the central micro structure comprises three rows of air holes arranged next to one another, and wherein the diameter of the middle row is smaller than the diameter of the two outer rows.

28. The fiber structure according to claim 27, wherein the central micro structure comprises three rows of air holes and wherein the middle row comprises a plurality of air-holes with a smaller diameter adapted for making the fiber to behave as a single mode fiber by making higher order modes much more lossy than lower order modes, and wherein the two outer rows which are neighboring the middle row comprise larger holes allowing a high confinement of light into the fiber core.

29. The fiber structure according to claim 27, wherein the birefringence responsive unit is a fiber Bragg grating.

30. The fiber structure according to claim 27, wherein the first plurality of longitudinal holes is arranged such that their longitudinal axes are parallel relative to the longitudinal axis of the core.

* * * * *

UNITED STATES PATENT AND TRADEMARK OFFICE
CERTIFICATE OF CORRECTION

PATENT NO. : 8,958,676 B2
APPLICATION NO. : 13/510689
DATED : February 17, 2015
INVENTOR(S) : Thomas Geerneart et al.

Page 1 of 1

It is certified that error appears in the above-identified patent and that said Letters Patent is hereby corrected as shown below:

On the title page:

In the Inventors item (75) for Tadeusz Martynkien, please delete "Kalisz" and replace with --Wroclaw--

Signed and Sealed this
Nineteenth Day of May, 2015

Michelle K. Lee
*Director of the United States Patent and Trademark Office*